UNITED STATES PATENT OFFICE.

VIGGO DREWSEN, OF BROOKLYN, NEW YORK, ASSIGNOR TO WEST VIRGINIA PULP & PAPER COMPANY, OF NEW YORK, N. Y., A CORPORATION OF DELAWARE.

PROCESS OF PRODUCING LIGNO TANNING MATERIAL FROM WASTE SULFITE LIQUORS, &c.

1,303,177. Specification of Letters Patent. Patented May 6, 1919.

No Drawing. Application filed March 30, 1915, Serial No. 18,049. Renewed November 22, 1918. Serial No. 263,779.

*To all whom it may concern:*

Be it known that I, VIGGO DREWSEN, a citizen of the United States, and resident of the borough of Brooklyn, county of Kings, city and State of New York, have made a certain new and useful Invention Relating to Processes of Producing Ligno Tanning Material from Waste Sulfite Liquor, &c., of which the following is a specification.

This invention relates especially to the manufacture of ligno-tanning material which can be prepared from the waste sulfite liquor produced during the manufacture of paper from wood, etc., the ligneous material in the waste liquor being preferably first precipitated and largely freed from undesirable organic material and then dissolved as in a solution of sodium carbonate or the like from which it may be precipitated and dried to produce the ligno-tanning material which is usually a yellowish powder representing some forty per cent. or so of the dry weight of the organic matter in waste sulfite liquor.

The waste sulfite liquor from the wood pulp process either before or after it is treated for the production of alcohol therefrom by the Ekstrom patent process, for instance, such as is described in the Ekstrom Patents 1,035,086, of August 6, 1912, and 1,042,332, of October 22, 1912, may be digested with lime in sufficient quantities to keep the liquor alkaline to litmus, preferably using one or two per cent. by weight or more hydrated lime which should be sufficient to at once render the mixture alkaline and maintain its alkaline character throughout this cooking process. The mixture may be digested for half an hour or more at a pressure of about one hundred pounds more or less per square inch in a suitable digester. This may be conveniently done by blowing steam of about the desired pressure into the bottom of the digester which thoroughly heats the material and simultaneously effects its agitation, although if desired a mechanical agitator may be employed either instead of or in addition to the steam jet agitation referred to. This seems to effect the formation of monosulfite of lime, that is, calcium sulfite ($CaSO_3$), which is precipitated together with the various lime lignins and other basic lime organic compounds. After the pressure on the digester has been relieved carbon-dioxid may be percolated through the entire mixture either at normal atmospheric-pressure or higher pressures which are desirable when weaker carbon-dioxid from flue gases is employed. This carbon-dioxid percolation is preferably continued until the liquor is substantially neutral to litmus and the excess of lime is neutralized and precipitated and some of the basic organic compounds seem to be dissolved, as is indicated by the darker brown color of the liquor which was a much lighter yellow before the carbon-dioxid treatment. The other precipitated ligneous material seems, however, to be so aggregated with the monosulfite of lime as to promote filtering. This material is now filtered as in a suitable filter press or the like and the resulting filtrate or liquor may be treated in various ways for recovery of solvents or other available material.

The precipitate or filter cake containing the lignin or ligneous material, together with more or less calcium monosulfite and so forth may then be cooked or digested in any suitable way as in an open vessel, or in a digester where higher pressures are desired, with sodium carbonate which may be used in about the same quantity as the lime originally cooked with the waste liquor, that is, to the extent of about one and one-half per cent. or more of the weight of the original waste sulfite liquor, it being desirable to use enough sodium carbonate so as to largely or substantially completely transform the calcium monosulfite into sodium monosulfite, that is, sodium sulfite ($Na_2SO_3$), which has a solvent action on the ligneous material, thus correspondingly minimizing the difficulty of filtering the calcium monosulfite. This material may be cooked for half an hour or more at atmospheric pressure as by running steam into the bottom of the cooking vessel or otherwise simultaneously heating and agitating the material at atmospheric or higher moderate pressures until the organic matters are substantially dissolved and a precipitate formed consisting of calcium carbonate and so forth usually known as lime slush which may be treated for the recovery of lime and so forth after this precipitate is separated or filtered in a suitable filter press or the like. The liquor containing the dissolved ligneous material is preferably evaporated to as high a concentration as is convenient without undesirably affecting its composition and it may be readily concentrated to a thick, syrupy consistency so as to even be semi-solid when cold. Sulfuric or other suitable acid preferably in such amount as to be equivalent to the amount of soda present in the liquor is added thereto and the whole heated to about eighty degrees centigrade or so when the dissolved organic material is precipitated from the concentrated solution in the form of a viscous or taffy-like amorphous material which becomes thinner with higher heat and which solidifies on cooling, but on further drying turns into the form of a yellowish brown powder. The original pitchy ligno-tanning material recovered in this way solidifies into a hard brittle substance on cooling and effloresces into this powdered form which is readily and substantially completely soluble in warm water so as to form a permanent solution which can be conveniently used as an effective tanning material for making leather and so forth. If desired, the powdered ligno-tanning material may be purified and rendered largely or practically ash-free by leaching with a small quantity of cold water to remove any traces of soda salts and so forth and may then be dried for convenient transportation.

This invention has been described in connection with a number of illustrative materials, proportions, pressures, conditions, arrangements and orders of steps, to the details of which disclosure the invention is not of course to be limited, since what is claimed as new and what is desired to be secured by Letters Patent is set forth in the appended claims:

1. The process of forming ligno-tanning material from the waste sulfite liquor from wood pulp manufacture which comprises digesting the waste liquor under a pressure of about 100 pounds per square inch with several per cent. of hydrated lime sufficient to render and maintain the mixture alkaline throughout the digestion, percolating carbon-dioxid through the digested material until it is substantially neutralized, in separating by filtration the precipitate comprising ligneous material and calcium monosulfite, cooking the precipitate with an amount of sodium carbonate substantially equal to the amount of hydrated lime used, to dissolve the ligneous material and precipitate the lime compounds, filtering out and concentrating the dissolved ligneous material, acidifying the concentrated hot solution with sulfuric acid to precipitate viscous ligno-tanning material therefrom and leaching soluble impurities out of the subsequently cooled powdered ligno-tanning material with small quantities of cold water.

2. The process of forming ligno-tanning material from the waste sulfite liquor from wood pulp manufacture which comprises digesting waste liquor under pressure with several per cent. of hydrated lime sufficient to render and maintain the mixture alkaline, percolating carbon-dioxid through the digested material until it is substantially neutralized, separating by filtration the precipitate comprising ligneous material and calcium monosulfite, cooking the precipitate with an amount of sodium carbonate substantially equal to the amount of hydrated lime used, to dissolve the ligneous material and precipitate the lime compounds, filtering out and concentrating the dissolved ligneous material, acidifying the concentrated hot solution to precipitate viscous ligno-tanning material therefrom and leaching soluble impurities out of the subsequently cooled powdered ligno-tanning material.

3. The process of forming ligno-tanning material from the waste sulfite liquor from wood pulp manufacture which comprises digesting the waste liquor under pressure with hydrated lime sufficient to render and maintain the mixture alkaline throughout the digestion, separating by filtration the precipitate comprising ligneous material and calcium monosulfite and neutralizing the same with carbon dioxid, cooking the precipitate with sodium carbonate and to dissolve the ligneous material and precipitate the lime compounds, filtering out and concentrating the dissolved ligneous material, and acidifying the concentrated hot solution to precipitate ligno-tanning material therefrom.

4. The process of forming ligno-tanning material from the waste sulfite liquor from wood pulp manufacture which comprises digesting the waste liquor under pressure with sufficient lime to render and maintain the mixture alkaline throughout the digestion, separating by filtration the precipitate comprising ligneous material and calcium monosulfite, cooking the precipitate with an amount of carbonate of an alkali substantially equal to the amount of hydrated lime used, to dissolve the ligneous material and precipitate the lime compounds, filtering out and concentrating the dissolved ligneous material and acidifying the concentrated hot solution to precipitate ligno-tanning material therefrom.

5. The process of forming ligno-tanning material from the waste sulfite liquor from wood pulp manufacture which comprises cooking the waste liquor with sufficient hydrated lime to render and maintain the mixture alkaline throughout the cooking, percolating carbon-dioxid through the cooked material until it is substantially neutralized, separating by filtration the precipitate comprising ligneous material and calcium monosulfite, treating the precipitate with carbonate of an alkali to dissolve the ligneous material and precipitate the lime compounds, filtering out and concentrating the dissolved ligneous material and in acidifying the concentrated solution to precipitate ligno-tanning material therefrom.

6. The process of forming ligno-tanning material from the waste sulfite liquor from wood pulp manufacture, etc., which comprises digesting the waste liquor under pressure with sufficient hydrated lime to render and maintain the mixture alkaline, substantially neutralizing and separating and cooking the precipitate with sodium carbonate to dissolve the ligneous material and precipitate the lime compounds, filtering out the dissolved ligneous material and adding acid to the solution and separating therefrom ligno-tanning material.

7. The process of forming ligno-tanning material from the waste sulfite liquor from wood pulp manufacture, etc., which comprises digesting the waste liquor with sufficient hydrated lime to render and maintain the mixture alkaline throughout the digestion, percolating carbon-dioxid through the cooked material until it is substantially neutralized, separating and cooking the precipitate with carbonate of an alkali to dissolve the ligneous material, filtering out the dissolved ligneous material and adding acid to the solution and separating therefrom ligno-tanning material.

8. The process of forming ligno-tanning material from waste sulfite liquor from wood pulp manufacture, etc. which comprises digesting the waste liquor with hydrated lime, separating and cooking the precipitate with carbonate of an alkali to dissolve the ligneous material, filtering out the dissolved ligneous material and concentrating the same and adding acid to the concentrated solution and separating therefrom the water soluble ligno-tanning material.

9. The process of forming water soluble substantially neutral ligno-tanning material from the waste sulfite liquor from wood pulp manufacture, etc. which comprises digesting the waste liquor under pressure with lime, separating and cooking the precipitate with alkali to dissolve the ligneous material and treating the same with carbon-dioxid, separating the dissolved ligneous material and adding acid to the solution and separating ligno-tanning material therefrom.

10. The process of forming water soluble ligno-tanning material from the waste sulfite liquor from wood pulp manufacture, etc. which comprises cooking the waste liquor with lime, separating and cooking the precipitate with alkali to dissolve the ligneous material, separating the dissolved ligneous material and adding acid to the solution and separating ligno-tanning material therefrom.

VIGGO DREWSEN.

Witnesses:
 HARRY L. DUNCAN,
 JESSIE B. KAY.